DEVICE FOR ELECTRICALLY AND PHYSICALLY CONNECTING AUTOMATIC DIALER TO TELEPHONE LINE IN RESPONSE TO ALARM CONDITION

Filed March 1, 1965

INVENTOR
McNEIL BRYAN
BY Thomas J. Nikolai
ATTORNEY

United States Patent Office 3,368,040
Patented Feb. 6, 1968

3,368,040

DEVICE FOR ELECTRICALLY AND PHYSICALLY CONNECTING AUTOMATIC DIALER TO TELEPHONE LINE IN RESPONSE TO ALARM CONDITION

McNeil Bryan, Centerville, Minn., assignor, by mesne assignments, to Lectro Systems, Incorporated, a corporation of Minnesota Filed Mar. 1, 1965, Ser. No. 435,909
9 Claims. (Cl. 179—5)

ABSTRACT OF THE DISCLOSURE

In response to an alarm condition a reversible motor is actuated to drive, via a worm screw, a pair of contact pins into telephone jacks, thereby connecting an automatic-dialing alarm device to the telephone lines. Upon cessation of the alarm signal, switching means reverse the motor, thereby retracting the contact pins from the jacks.

This invention relates generally to automatic alarm apparatus adapted to automatically "dial" predetermined telephone numbers in the event of an abnormal condition, and more specifically to a device for establishing a connection to a telephone line such that dialing pulses and/or other information can be transmitted over the lines.

In a copending patent application, Ser. No. 219,209, filed Aug. 24, 1962, by James E. Moore, Jr., entitled, "Fire-Intrusion Automatic Telephone Dial Alarm Device" (now Patent 3,287,500) which is assigned to the assignee of the present invention, there is described an automatic fire-intruder alarm system which includes a magnetic tape playback system connected to a telephone installation and which when activated, is capable of "dialing" a predetermined number.

After a connection to a remote station is established, a prerecorded message is played over the telephone to advise authorities of the abnormal conditions detected at the sending station. While the device described in the above-referenced application operates satisfactorily, some resistance has been met in the marketing of it because of certain tariff regulations of the major telephone companies serving the United States. These regulations forbid mechanically or electrically attaching equipment not approved by the telephone company to their facilities.

The present invention provides a means which will electrically connect the automatic dialing alarm device to the telephone lines only in the event of an abnormal condition, e.g., the occurrence of a fire or the detection of an intruder, but which is otherwise at all times completely isolated (mechanically and electrically) from the telephone facilities. Hence, it is expected that by using the present invention there will be no violation of existing regulations.

In its simplest form, the preferred embodiment of the present invention comprises an electro-mechanical device which is effective to insert contact pins into a standard wall-type telephone jack only in the event of an abnormal condition, but which in the standby condition provides complete isolation from the telephone lines. The device comprises a motor driven set of contact pins. The motor is preferably a reversible direct current motor which is normally de-energized in the absence of an abnormal condition. The motor is adapted to drive a worm screw to provide translational motion to a carriage on which is mounted the male contact members. The motor is operatively connected to the aforementioned automatic dialing alarm device and becomes energized upon the occurrence of the abnormal condition. The male contact members are then moved into the female receptacles of the standard wall-mounted telephone jacks to complete the circuit between the automatic telephone dialing alarm device and the telephone lines leading to the exchange. Upon cessation of the alarm signalling function, switching means become operative to reverse the current flow through the motor, causing the male contacts to be withdrawn from the telephone jacks. Furthermore, limit switches are provided for controlling the motor operation during the insertion and withdrawal of the male contacts.

It is accordingly an object of the present invention to provide a device for use with an automatic telephone dialing alarm system, which operates to connect the alarm system to the telephone lines only when an abnormal condition is detected.

Another object of this invention is to provide a motor driven mechanism for establishing an electrical connection between an automatic telephone dialing alarm system and the telephone lines.

A still further object of the invention is to provide a device of a simple design which is inexpensive to manufacture and operate, small in size, and is reliable in its performance.

Other objects and advantages will become apparent to those skilled in the art upon reading the following specification taken in conjunction with the accompanying drawings in which like numerals designate corresponding parts throughout the several views, and wherein.

Figure 1:
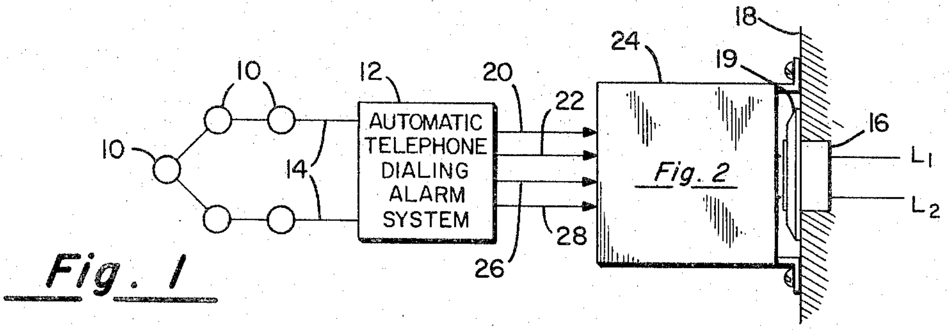
FIG. 1 is a block diagram representation of the alarm system.

Referring now to FIGURE 1, there is shown a block diagram of the alarm system incorporating the present invention. A plurality of sensing devices 10 are distributed throughout an area to be protected and may for example take the form of thermostatic type switches for over-temperature sensing or any one of a number of different devices commonly employed for sensing the presence of an intruder. The sensing devices 10 are connected into the automatic telephone dialing alarm systems 12 by the loop conductors 14. A typical example of an alarm device is fully described in the afore-referenced Moore application. The device described in that application becomes operative in the event of an abnormal temperature condition or the presence of an intruder to automatically "dial" a telephone number and subsequently to play a recorded voice message over the telephone lines after a connection has been established to a receiving telephone station.

In FIGURE 1, the lines $L_1$ and $L_2$ represent telephone lines leading from a standard wall-type plug-in telephone jack 16 mounted on a wall 18 to a telephone exchange (not shown). A decorative cover plate 19 is used to cover the hole in the wall used to accommodate the phone jack 16. The lines 26 and 28 leading from the alarm device 12 to the plug-in mechanism 24 terminate at the male contact pins of the plug (not shown in FIGURE 1). This plug is adapted to be inserted into the jack 16 such that a continuous electrical connection can be made between the alarm system 12 and the telephone lines $L_1$ and $L_2$.

The conductors 20 and 22 leading from the alarm device 12 and entering the mechanism 24 supply the power for operating the device for inserting the plug terminal into the jack 16. A reading of the afore-referenced Moore application clearly illustrates that the voltages necessary are available for supplying signals to the plug inserting devices of the present invention.

Figure 2:
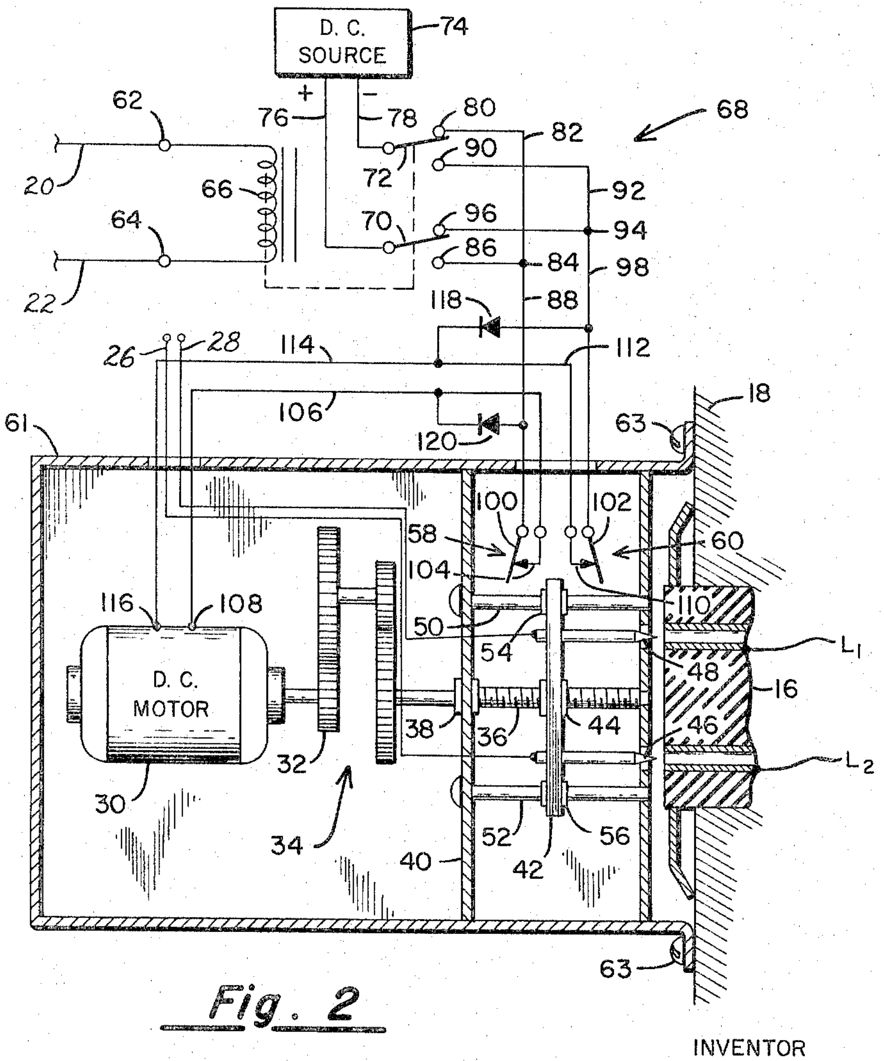
FIG. 2 is a mechanical and electrical schematic diagram of the present invention which shows the arrangement of the various functional parts.

For a clearer understanding of the operation of the present invention, reference is made to the cross-sectional view of FIGURE 2, which clearly illustrates the arrangement of the various functional parts comprising the invention. In FIGURE 2, there is shown a reversible direct current motor 30 having an armature shaft 32 connected through a gear train indicated generally by numeral 34 to a drive-screw or worm 36. Worm 36 is journalled at one end in a suitable bearing 38 mounted in a housing 40. The gear train 34 serves to amplify the motor torque applied to the worm. However, it should be obvious that no gear train is necessary where the motor is specially designed for the particular application in terms of speed and output torque.

An electrically insulating contact support member 42 forms the carriage for the worm and has a threading bushing 44 affixed thereto and is used to support the male contact pins 46 and 48. The leads 20 and 22 (FIGURE 1) are connected to the pins 46 and 48. The threaded bushing is designed to cooperate with the drive screw 36 in a conventional manner such that translational motion is imparted to the plug member upon rotation of the drive screw by the motor 30.

In order to constrain the motion of the plug member to a direction parallel to the direction of the female contacts of the phone jack 16, a pair of guide pins 50 and 52 are mounted on the housing 40 in a parallel and spaced-apart relationship with respect to the drive screw 36. These pins pass through bushings 54 and 56 in the insulating support member 42 of the plug, thereby serving as guides for the plug assembly.

Also contained within the housing 40 are a pair of normally closed short-stroke mechanically operated switches 58 and 60. Switches 58 and 60 are positioned to be operated by the motion of the carriage 42. More specifically, when the carriage is in its leftmost position such that the pin members 46 and 48 are completely withdrawn from the female receptacles of the telephone jack 16, the switch 58 is open while switch 60 is closed. Similarly, when the carriage member is in its rightmost position with the pins 46 and 48 fully inserted into the female receptacles, the switch 60 is opened whereas the switch 58 is closed. During the time that the carriage is travelling between these two extremes, both switches 58 and 60 are closed.

Now that the arrangement of the various mechanical parts have been described in detail, consideration will next be given to the electrical circuits incorporated in the preferred embodiment of the present invention. In the preferred embodiment, the circuits are contained within the cover 61, but for the sake of clarity in the drawings, they are illustrated as being external to the cover. The cover or housing 61 is adapted to be fastened to the wall 18 by any suitable means such as screws 63 so as to surround the jack 16 without in any way mechanically touching the jack which is considered as equipment belonging to the phone company.

The lines 20 and 22 coming from the alarm device 12 (FIGURE 1) are connected to the input terminals 62 and 64 of a relay winding 66. It may be recalled that the signals appearing on lines 20 and 22 only occur upon the detection of an abnormal condition by the alarm device 12. Hence, relay winding 66 becomes energized only in the event that an abnormal condition occurs. The relay winding 66 is arranged to operate a double-pole, double-throw switch indicated generally by numeral 68. The switch arms 70 and 72 of the switch 68 are connected to a suitable source of direct current voltage 74 by means of conductors 76 and 78, respectively. The source 74 may be a separate D.C. power supply but in the preferred embodiment, the automatic telephone dialing alarm device 12 contains a power supply which may be used for the same purpose. The normally closed contact 80 of switch 68 is connected by a conductor 82 to a junction 84 between a normally opened contact 86 of switch 68 and a conductor 88. The normally opened contact 90 of switch 68 is connected by means of conductor 92 to a junction 94 between the normally closed contact 96 and a conductor 98.

Conductor 88 connects the junction 84 to the switch arm 100 of the mechanically operated switch 58. Similarly, the conductor 98 connects the junction 94 to the switch arm 102 of the mechanically operated switch 60. The normally closed contact 104 of switch 58 is connected by a conductor 106 to a first terminal 108 of the motor 30. The normally closed contact 110 of switch 60 is connected by a conductor 112 and 114 to the other terminal 116 of the motor 30. To complete the description of the electrical circuits, current by-pass means are provided which comprise a first diode 118 connected across the contacts of the switch 60 with the anode thereof being connected to the switch arm 102 and a diode 120 connected across the contacts of switch 58 with the anode thereof being connected to the switch arm 100.

Now that the electrical connection has been described in detail, consideration will next be given to the operation of the system.

*Operation*

In considering the operation of the system first assume that the carriage member 42 is in its leftmost position such that the switch 58 is open. Also assume that no alarm condition exists such that the relay 66 is de-energized. No current flows from the positive terminal of the D.C. source 74 because the diode 120 is poled to present a high impedance to the current which would otherwise flow in this path if the contact 58 were closed. In other words, no current flows at this time in the following path: from the positive terminal through conductor 76, through the switch contacts 70–96, through conductor 98, through contacts 102–110, through conductors 112, 114 and 106, back through conductors 88, 82, and 78 to the negative terminal of the source.

Upon energization of the relay 66, the contact arms 70 and 72 of the double-pole, double-throw switch 68 reverse from the position illustrated. It can be seen that now a current can flow from the positive terminal of source 74 through conductor 76, through contacts 70–86, through conductor 88 and the diode 120, through conductor 106 to the terminal 108 of the motor 30. After passing through the motor, the current leaves terminal 116 and follows conductors 114, 112 and 98 and through the switch contacts 72–90 and conductor 78 back to the negative terminal of the source. The motor, being energized with a current flow in the direction mentioned above, causes the worm to rotate such that the carriage 42 is moved towards the right. The contacts 58–104 close to maintain the motor energized until such time that the carriage causes the switch 60 to open. When this happens, the current ceases to flow through the above-mentioned path.

The travel of the carriage to the right causes the pins 46 and 48 to be inserted into the female receptacles of the telephone jack. Upon completion of the message dialing operation and the transmission of the recorded message by the automatic telephone dialing alarm device 12, the alarm signal is removed from the lines 20 and 22. Accordingly, the relay winding 66 again becomes de-energized. The contact arms 70 and 72 of the switch 68 therefore revert back to their normal position illustrated in the drawing of FIGURE 2. Now a current path is established from the positive terminal through conductor 76, through contacts 70–96, through conductor 98, through diode 118 and conductor 114 to the terminal 116 of motor 30. After passing through the motor the current leaves terminal 108 and passes through conductor 106 and switch contacts 100–104 and through conductors 88, 82 and 78 to the negative terminal of the D.C. supply 74. It should be noted in particular that the direction of current flow through the motor is opposite to that which existed when the carriage was being moved to the right. Hence, the direction of the rotation of motor 30 will be reversed and the carriage member will be withdrawn from the telephone jacks and moved towards the left. The motor will continue to drive the carriage to the left until such time that the contacts 100–104 of switch 58 are again broken. This will stop the current flowing through the motor and the equipment will again be in its standby condition ready to operate in the event of another abnormal condition.

Thus, it can be seen that there is provided a device to be used with a telephone alarm system which maintains the alarm system completely isolated from the telephone company equipment in the absence of an abnormal condition but which is effective, upon the detection of an abnormal condition to establish an electrical connection between the alarm device and the telephone lines.

Although the present invention has been shown and described with reference to a single preferred embodiment, it will be appreciated that changes and modifications may be made from a knowledge of the teachings of the present invention which do not, in truth and in fact, depart from the concept of the invention. Hence, the invention is not to be limited or restricted to precisely what is shown and described, but rather, should be construed in the light of the fundamentally new principles as embodied in the teachings disclosed herein.

What is claimed is:

1. Apparatus for establishing a physical connection between an automatic telephone dialing alarm device and a telephone line leading to a telephone exchange only upon the occurrence of an abnormal condition comprising:

(A) an automatic telephone dialing mechanism adapted to produce dialing pulses on a set of output lines in response to the occurence of an abnormal condition;

(B) movable contact means connected to said output lines;

(C) a motor mechanically connected to said movable contact means for imparting translational motion to said movable contact means upon electrical energization of said motor; and (D) switching means adapted to connect said motor to a source of electrical energy upon the occurrence of said abnormal condition.

2. Apparatus for establishing a physical connection between an automatic telephone dialing alarm device and a telephone line leading to a telephone exchange only upon the occurrence of an abnormal condition, comprising:

(A) a telephone jack connected to said telephone line;

(B) a movable plug adapted to be inserted in said jack;

(C) an automatic telephone dialing alarm device for producing dialing pulses on a set of output lines in response to the occurrence of an abnormal condition;

(D) means connecting said output lines to said plug;

(E) a motor mechanically connected to said plug for imparting translation motion to said plug upon electrical energization of said motor; and (F) switching means adapted to electrically connect said motor to a source of electrical energy upon the occurrence of said abnormal condition, such that said plug is moved into electrical engagement with said jack.

3. Apparatus as in claim 2 and further including means for mechanically mounting said motor and plug in a non-contact relationship with respect to said telephone jack in the absence of an abnormal condition.

4. In apparatus of the type described, the combination comprising:

(A) an electrical plug movable between a disengaged and an engaged position with respect to an electrical socket;

(B) motor means mechanically connected to said plug for imparting translational motion to said plug; and (C) switching means operative to connect said motor to a source of electrical energy such that said plug is moved from said disengaged position to said engaged position when said switching means is in a first position and from said engaged position to said disengaged position when said switching means is in a second position.

5. Apparatus as in claim 4 wherein said switching means further includes limit defining means for disconnecting said motor from said source of electrical energy when said plug is moved to said engaged and disengaged position.

6. Apparatus as in claim 4 and further including actuating means for operating said switching means between said first and second positions.

7. Apparatus as in claim 4 wherein said switching means comprises:

(A) a relay having a set of double-pole, double-throw contacts, said source of electrical energy being connected to said poles;

(B) a first normally closed single-pole, single-throw switch positioned to be opened by said plug when in said disengaged position;

(C) a second normally closed single-pole, single-throw switch positioned to be opened by said plug when in said engaged position;

(D) means connecting said first and second switches in series with said motor means and said double-throw contacts; and (E) unidirectional current conducting means connected in parallel with said first and second switches.

8. In apparatus of the type described, the combination comprising:

(A) an electrical plug adapted to be inserted in an electrical outlet including, (a) an electrically insulating support member having an aperture therein (b) contact means affixed to said support member (c) a threaded bushing mounted in said aperture (B) an electric motor;

(C) an elongated threaded member journalled for rotation passing through said bushing, and the threads of said threaded member engaging the threads on said bushing; and (D) means connecting said motor to said threaded member for rotating said threaded member to thereby impart translational motion to said plug.

9. A control circuit for a motor driven carriage member for controlling the direction and limits of motion of said carriage, comprising:

(A) a direct current voltage source having first and second terminals;

(B) a direct current motor having a pair of input terminals;

(C) a pair of diodes;

(D) means connecting the cathode electrodes of said diodes to the input terminals of said motor;

(E) means connecting the anode electrodes of said diodes to said first and second terminals of said voltage source;

(F) a carriage member;

(G) means connecting said motor to said carriage member for imparting translational motion to said carriage upon energization of said motor;

(H) a pair of normally closed switches connected in parallel with said first and second diodes and positioned to be operated by the motion of said carriage member; and (I) means for reversing the polarity of the voltage applied to said anode electrodes of said diodes.

References Cited

UNITED STATES PATENTS

| | | | |
|---|---|---|---|
| 1,215,573 | 2/1917 | Otis | 318—266 |
| 2,379,047 | 6/1945 | Thomas | 339—9 |

FOREIGN PATENTS

| | | |
|---|---|---|
| 626,118 | 8/1961 | Canada. |

ROBERT L. GRIFFIN, *Primary Examiner.*

JOHN W. CALDWELL, *Examiner.*

J. T. STRATMAN, *Assistant Examiner.*